(12) United States Patent
Chen et al.

(10) Patent No.: US 9,954,696 B2
(45) Date of Patent: Apr. 24, 2018

(54) METHOD AND APPARATUS FOR ENCODING UPLINK CONTROL INFORMATION

(71) Applicant: Huawei Technologies Co., Ltd., Shenzhen (CN)

(72) Inventors: Jun Chen, Shenzhen (CN); Bin Li, Shenzhen (CN); Hui Shen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 161 days.

(21) Appl. No.: 14/866,346

(22) Filed: Sep. 25, 2015

(65) Prior Publication Data

US 2016/0020926 A1   Jan. 21, 2016

Related U.S. Application Data

(63) Continuation of application No. PCT/CN2013/087236, filed on Nov. 15, 2013.

(30) Foreign Application Priority Data

Mar. 27, 2013 (CN) .......................... 2013 1 0102426

(51) Int. Cl.
*H04L 25/02* (2006.01)
*H04L 1/00* (2006.01)
*H04W 72/04* (2009.01)

(52) U.S. Cl.
CPC ........ *H04L 25/0242* (2013.01); *H04L 1/0041* (2013.01); *H04L 1/0072* (2013.01); *H04W 72/0413* (2013.01)

(58) Field of Classification Search
None
See application file for complete search history.

(56) References Cited

U.S. PATENT DOCUMENTS

| | | |
|---|---|---|
| 2008/0310383 A1 | 12/2008 | Kowalski |
| 2011/0268090 A1* | 11/2011 | Qu .................. H03M 13/136 370/335 |

(Continued)

FOREIGN PATENT DOCUMENTS

| | | |
|---|---|---|
| CN | 101409894 A | 4/2009 |
| CN | 101682364 A | 3/2010 |

(Continued)

OTHER PUBLICATIONS

Arikan, "Systematic Polar Coding," IEEE Communications Letters, vol. 15, Issue 8, pp. 860-862, Institute of Electrical and Electronics Engineers, New York, New York (Aug. 2011).

(Continued)

*Primary Examiner* — Sulaiman Nooristany
(74) *Attorney, Agent, or Firm* — Leydig, Voit & Mayer, Ltd.

(57) ABSTRACT

Embodiments of the present invention provide a method and an apparatus for encoding uplink control information, so as to optimize the performance of uplink control information transmission. The method includes: shifting a column vector of a predefined encoding matrix M to generate a new encoding matrix M'; and encoding uplink control information by using the new encoding matrix M'. The encoding matrix used for encoding the uplink control information is no longer a fixed predefined encoding matrix, but the new encoding matrix generated after shifting the column vectors of the predefined encoding matrix. Comparing with the method in prior art, the method in embodiments of the present invention can determine a corresponding encoding matrix according to the uplink control information, thereby optimizing the performance of the uplink control information transmission and then improving the efficiency of downlink transmission.

2 Claims, 3 Drawing Sheets

(56) References Cited

U.S. PATENT DOCUMENTS

| | | | |
|---|---|---|---|
| 2012/0033587 A1 | 2/2012 | Papasakellariou et al. | |
| 2012/0201212 A1 | 8/2012 | Xia et al. | |
| 2012/0207108 A1* | 8/2012 | Larsson | H04L 1/0026 370/329 |
| 2013/0064207 A1 | 3/2013 | Wang et al. | |
| 2013/0070580 A1* | 3/2013 | Wang | H04J 13/004 370/209 |
| 2015/0171982 A1 | 6/2015 | Wang et al. | |
| 2015/0195832 A1 | 7/2015 | Cheng et al. | |

FOREIGN PATENT DOCUMENTS

| | | |
|---|---|---|
| CN | 101695017 A | 4/2010 |
| CN | 101902313 A | 12/2010 |
| CN | 102377529 A | 3/2012 |
| CN | 102468917 A | 5/2012 |
| CN | 103220083 A | 7/2013 |
| WO | WO 2011120233 A1 | 10/2011 |

OTHER PUBLICATIONS

"Research and Simulation of Uplink Control Channel Based on LTE/LTE-A System," (Dec. 2011).

Arikan, "Channel Polarization: A Method for Constructing Capacity-Achieving Codes for Symmetric Binary-Input Memoryless Channels," IEEE Transactions on Information Theory, vol. 55, Issue 7, pp. 3051-3073, Institute of Electrical and Electronics Engineers, New York, New York (Jul. 2009).

Arikan, "A Performance Comparison of Polar Codes and Reed-Muller Codes," IEEE Communications Letters, vol. 12, Issue 6, pp. 447-449, Institute of Electrical and Electronics Engineers, New York, New York (Jun. 2008).

"$3^{rd}$ Generation Partnership Project; Technical Specification Group Radio Access Network; Evolved Universal Terrestrial Radio Access (E-UTRA); Multiplexing and channel coding (Release 10)," 3GPP TS 36.212, V10.5.0, pp. 1-79, $3^{rd}$ Generation Partnership Project, Valbonne, France (Mar. 2012).

* cited by examiner

METHOD AND APPARATUS FOR ENCODING UPLINK CONTROL INFORMATION

CROSS REFERENCE TO RELATED APPLICATIONS

This application is a continuation of International Patent Application No. PCT/CN2013/087236, filed on Nov. 15, 2013, which claims priority to Chinese Patent Application No. 201310102426.3, filed on Mar. 27, 2013, both of which are incorporated herein by reference in their entireties.

TECHNICAL FIELD

The present invention relates to the field of communication technologies, and, in particular, to a method and an apparatus for encoding uplink control information.

BACKGROUND

Under the guide of the information theory, the theoretical research of channel encoding has been developed rapidly, people have developed many encoding technologies with outstanding performances, such as a block code, a convolutional code and a concatenated code, for example, the Turbo code is a kind of concatenated code, and the RM code and the Polar code are block codes, where Polar code is a new encoding technology being close to a channel capacity and has received extensive attention and researches. The basic encoding principle of the Polar code is to use a Bhattacharyya parameter or a symmetric capacity to determine a row vector (or a column vector) of an encoding matrix according to a specific condition. In addition, a bit error code rate may be used to determine a corresponding encoding matrix. In this way, the Polar code can obtain optimal performance through a specific selection of the row vector (or the column vector) of the encoding matrix. In a long term evolution (LTE) and an advanced long term evolution (Advanced LTE) systems, the Turbo code or the RM code is usually used to encode uplink control information such as a channel quality indicator (CQI).

A method for encoding the uplink control information by using the RM code as provided in the prior art is that: a physical uplink control channel (PUCCH) of the LTE system or the LTE-Advanced system uses an encoding matrix LTE RM (20, A) to encode a CQI, where the encoding process is:

$$b_i = \sum_{k=0}^{A-1} (a_k \cdot M_{i,k}) \bmod 2$$

where, $M_{i,k}$ is an element on the $i^{th}$ row and the $k^{th}$ column of an encoding matrix M, the number of lines and the number of columns of the encoding matrix M are respectively N and K, the input of the encoder is a CQI information bit sequence $a_0, a_1, a_2, a_3, \ldots, a_{A-1}$, the output of the encoder is a code word bit sequence $b_0, b_1, b_2, b_3, \ldots, b_{B-1}$, A is the number of bits for the CQI information, B is the number of code word bits, $1 \leq A \leq K$, B=N.

In the aforementioned method for encoding the uplink control information by using the RM code as provided in the prior art, the encoding matrix LTERM (20, A) used by the LTE and the LTE-Advanced systems fails to determine the column vector of the encoding matrix reasonably according to the change of the number of control information (such as the CQI) bits A, namely, the same encoding matrix is used all the time no matter how great the number of control information bits A is, thus resulting in that the performance of uplink control information transmission is not optimal and the efficiency of a corresponding downlink transmission is not high.

SUMMARY

Embodiments of the present invention provide a method and an apparatus for encoding uplink control information, so as to optimize performance of uplink control information transmission.

Embodiments of the present invention provide a method for encoding uplink control information, the method includes:

shifting column vectors of a predefined encoding matrix M to generate a new encoding matrix M';

encoding uplink control information by using the new encoding matrix M'.

Embodiments of the present invention provide an apparatus for encoding uplink control information, the apparatus includes:

an encoding matrix generating module, configured to shift column vectors of a predefined encoding matrix M to generate a new encoding matrix M';

an encoding module, configured to encode uplink control information by using the new encoding matrix M'.

Embodiments of the present invention also provide an encoding matrix, where the encoding matrix is M', the encoding matrix M' is generated by shifting column vectors of a predefined encoding matrix M, and the shifting the column vectors of the predefined encoding matrix M to generate the new encoding matrix M' includes:

performing a cyclic shift on the column vectors of the predefined encoding matrix M, so that a $k^{th}$ column vector $M_k$ of the encoding matrix M is replaced by an $f(k)^{th}$ column vector $M_{f(k)}$ of the encoding matrix M, the $f(k)^{th}$ column vector $M_{f(k)}$ constitutes a $k^{th}$ column vector $M'_k$ of the new encoding matrix M', where the $f(k)=(f_0(A)+f_1 \times k) \bmod K$, the $f_0(A)$ is an integer function of A, the $f_1$ is an integer, the k=0, 1, ..., K−1, the K is the number of columns of the predefined encoding matrix M, the A is the number of bits for uplink control information, and the mod is a modulus operation; or, where the shifting the column vectors of the predefined encoding matrix M to generate the new encoding matrix M' includes:

performing a fixed shift on the column vectors of the predefined encoding matrix M, so that a $k^{th}$ column vector $M_k$ of the encoding matrix M is replaced by an $f(k)^{th}$ column vector $M_{f(k)}$ of the encoding matrix M, the $f(k)^{th}$ column vector $M_{f(k)}$ constitutes a $k^{th}$ column vector $M'_k$ of the new encoding matrix M', where the $f(k)=(f_0+f_1 \times k) \bmod K$, the $f_0$ and the $f_1$ are integers, the k=0, 1, ..., K−1, and the K is the number of columns of the predefined encoding matrix M;

the predefined encoding matrix M is $$M = \begin{bmatrix} 1 & 1 & 0 & 0 & 0 & 0 \\ 1 & 1 & 1 & 0 & 0 & 0 \\ 1 & 0 & 0 & 1 & 0 & 0 \\ 1 & 0 & 1 & 1 & 0 & 0 \\ 1 & 1 & 1 & 1 & 0 & 0 \\ 1 & 1 & 0 & 0 & 1 & 0 \\ 1 & 0 & 1 & 0 & 1 & 0 \\ 1 & 0 & 0 & 1 & 1 & 0 \\ 1 & 1 & 0 & 1 & 1 & 0 \\ 1 & 0 & 1 & 1 & 1 & 0 \\ 1 & 0 & 1 & 0 & 0 & 1 \\ 1 & 1 & 1 & 0 & 0 & 1 \\ 1 & 0 & 0 & 1 & 0 & 1 \\ 1 & 1 & 0 & 1 & 0 & 1 \\ 1 & 0 & 0 & 0 & 1 & 1 \\ 1 & 1 & 0 & 0 & 1 & 1 \\ 1 & 1 & 1 & 0 & 1 & 1 \\ 1 & 0 & 0 & 1 & 1 & 1 \\ 1 & 1 & 0 & 1 & 1 & 1 \\ 1 & 0 & 0 & 0 & 0 & 1 \end{bmatrix},$$

and the encoding matrix M' is $$M' = \begin{bmatrix} 1 & 0 & 0 & 0 & 0 & 1 \\ 1 & 0 & 0 & 0 & 1 & 1 \\ 1 & 0 & 0 & 1 & 0 & 0 \\ 1 & 0 & 0 & 1 & 1 & 0 \\ 1 & 0 & 0 & 1 & 1 & 1 \\ 1 & 0 & 1 & 0 & 0 & 1 \\ 1 & 0 & 1 & 0 & 1 & 0 \\ 1 & 0 & 1 & 1 & 0 & 0 \\ 1 & 0 & 1 & 1 & 0 & 1 \\ 1 & 0 & 1 & 1 & 1 & 0 \\ 1 & 1 & 0 & 0 & 1 & 0 \\ 1 & 1 & 0 & 0 & 1 & 1 \\ 1 & 1 & 0 & 1 & 0 & 0 \\ 1 & 1 & 0 & 1 & 0 & 1 \\ 1 & 1 & 1 & 0 & 0 & 0 \\ 1 & 1 & 1 & 0 & 0 & 1 \\ 1 & 1 & 1 & 0 & 1 & 1 \\ 1 & 1 & 1 & 1 & 0 & 0 \\ 1 & 1 & 1 & 1 & 0 & 1 \\ 1 & 1 & 0 & 0 & 0 & 0 \end{bmatrix}.$$

It can be seen from the aforementioned embodiments of the present invention that, the encoding matrix used for encoding the uplink control information is no longer a fixed predefined encoding matrix, but a new encoding matrix generated after shifting column vectors of the predefined encoding matrix. Comparing with the method in prior art that employs the same encoding matrix to encode uplink control information regardless of the number of bits for the control information, the method in embodiments of the present invention can determine a corresponding encoding matrix according to the uplink control information, thereby optimizing the performance of the uplink control information transmission and thus improving the efficiency of downlink transmission.

BRIEF DESCRIPTION OF DRAWINGS

To describe the technical solutions in embodiments of the present invention or in the prior art more clearly, the following briefly introduces the accompanying drawings needed for describing the embodiments or the prior art. Apparently, the accompanying drawings in the following description illustrate merely some embodiments of the present invention, and persons of ordinary skill in the art may still derive other drawings from these accompanying drawings without creative effort.

DESCRIPTION OF EMBODIMENTS

The technical solution of the present invention is hereinafter described in detail with reference to the accompanying drawings. It is evident that the embodiments are only some exemplary embodiments of the present invention, and the present invention is not limited to such embodiments. Other embodiments that those skilled in the art obtain based on embodiments of the present invention also fall within the protection scope of the present invention.

Figure 1:
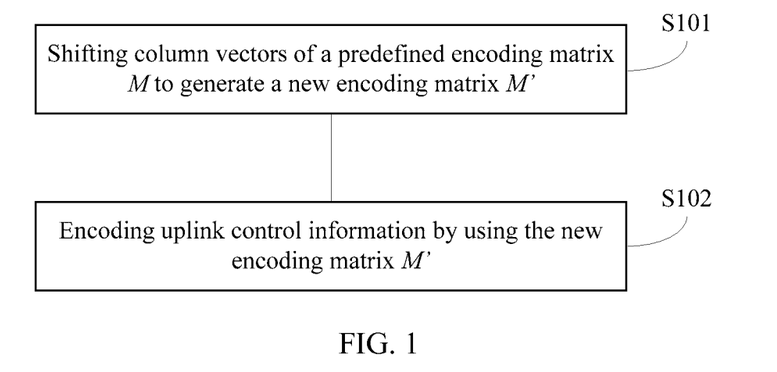
FIG. 1 is a schematic flowchart of a method for encoding uplink control information according to an embodiment of the present invention.

Please refer to FIG. 1, which is a schematic flowchart of a method for encoding uplink control information according to an embodiment of the present invention, and mainly includes step S101 and step S102, the detailed description are as following:

S101, shifting column vectors of a predefined encoding matrix M to generate a new encoding matrix M'.

In embodiments of the present invention, the predefined encoding matrix M is an encoding matrix predefined according to a specific condition before encoding the uplink control information. For example, according to the specific condition that a code length in the LTE system is 20, and A is a value selected between 1 and 13, predefine a Reed-Muller code (RM) encoding matrix RM (20, A), where A is the number of bits for the uplink control information such as channel quality indicator (CQI) information. Differing from the prior art which always uses the predefined encoding matrix to encode the uplink control information, in embodiments of the present invention, the used encoding matrix is generated after shifting the column vectors of the predefined encoding matrix.

As an embodiment of shifting the column vectors of the predefined encoding matrix M to generate a new encoding matrix M', a cyclic shift may be performed on the column vectors of the predefined encoding matrix M, so that the $k^{th}$ column vector $M_k$ of the encoding matrix M is replaced by the $f(k)^{th}$ column vector $M_{f(k)}$ of the encoding matrix M, after the replacement, the encoding matrix M becomes the new encoding matrix M', the $f(k)^{th}$ column vector $M_{f(k)}$ constitutes the $k^{th}$ column vector $M'_k$ of the new encoding matrix M', namely, for the new encoding matrix M', $M'_k = M_{f(k)}$, where, $f(k)=(f_0(A)+f_1 \times k) \bmod K$, $f_0(A)$ is an integer function of A, $f_1$ is an integer, k=0, 1, . . . , K−1, K is the number of columns of the predefined encoding matrix M, A is the number of bits for the uplink control information, the symbol "mod" is a modulus operation, which represents taking $f_0(A)+f_1 \times k$ modulo K. In the embodiment of the present invention, $f_0(A)$ may be 1−A, $f_1$ may be 1, namely, $f(k)=(1-A+k) \bmod K$. The function $f(k)$ also represents the number of right cyclic shifts of each column vector during the process of shifting the column vectors of the predefined encoding matrix M to generate the new encoding matrix M'. For example, the Polar (20, A) encoding matrix M' is generated by performing a cyclic shift on the first six column vectors of the LTE RM (20, A) encoding matrix M according to the function $f(k)=(1-A+k) \bmod K$, N=20, K=6, the number of right cyclic shifts of each column vector is F=A−1.

As another embodiment of shifting the column vectors of the predefined encoding matrix M to generate the new encoding matrix M', a fixed shift may be performed on the column vectors of the predefined encoding matrix M, so that the $k^{th}$ column vector $M_k$ of the encoding matrix M is replaced by the $f(k)^{th}$ column vector $M_{f(k)}$ of the encoding matrix M, after the replacement, the encoding matrix M becomes the new encoding matrix M', the $f(k)^{th}$ column vector $M_{f(k)}$ constitutes the $k^{th}$ column vector $M'_k$ of the new encoding matrix M', namely, for the new encoding matrix M', $M'_k=M_{f(k)}$, where, $f(k)=(f_0+f_1 \times k) \bmod K$, $f_0$ and $f_1$ are integers, k=0, 1, . . . , K−1, K is the number of columns of the predefined encoding matrix M. In this embodiment, $f_0$ may be K, $f_1$ may be −1, namely, $f(k)=(K-k) \bmod K$.

S102, encoding uplink control information by using the new encoding matrix M'.

Corresponding to the above embodiment that performs a cyclic shift on the column vectors of the predefined encoding matrix M, so that the $k^{th}$ column vector $M_k$ of the encoding matrix M is replaced by the $f(k)^{th}$ column vector $M_{f(k)}$ of the encoding matrix M and then $f(k)=(f_0(A)+f_1 \times k) \bmod K$, as an embodiment of encoding uplink control information by using a new encoding matrix M' according to the present invention, a bit sequence $a_0, a_1, a_2, a_3, \ldots, a_{A-1}$ of uplink control information such as CQI information may be encoded in an encoding manner that $$b_i = \left(\sum_{k=0}^{A-1}(a_{A-1-k} \times M'_{i,k})\right) \bmod 2,$$

where, $M'_{i,k}$ is an element on the $i^{th}$ row and the $k^{th}$ column of the new encoding matrix M', $a_{A-1-k}$ is a bit with a corresponding subscript in the bit sequence $a_0, a_1, a_2, a_3, \ldots, a_{A-1}$, $b_i$ is a code word with a corresponding subscript in a code word bit sequence $b_0, b_1, b_2, b_3, \ldots, b_{B-1}$ which is obtained after encoding the bit sequence $a_0, a_1, a_2, a_3, \ldots, a_{A-1}$ of uplink control information in the encoding manner that $$b_i = \left(\sum_{k=0}^{A-1}(a_{A-1-k} \times M'_{i,k})\right) \bmod 2,$$

B is the number of code word bits.

Corresponding to the above embodiment that perform a fixed shift on the column vectors of the predefined encoding matrix M, so that the $k^{th}$ column vector $M_k$ of the encoding matrix M is replaced by the $f(k)^{th}$ column vector $M_{f(k)}$ of the encoding matrix M and then $f(k)=(f_0+f_1 \times k) \bmod K$, as another embodiment of encoding uplink control information by using a new encoding matrix M' according to the present invention, a bit sequence $a_0, a_1, a_2, a_3, \ldots, a_{A-1}$ of uplink control information such as CQI information may be encoded in an encoding manner that $$b_i = \left(\sum_{k=0}^{A-1}(a_k \times M'_{i,k})\right) \bmod 2,$$

where, $M'_{i,k}$ is an element on the $i^{th}$ row and the $k^{th}$ column of the new encoding matrix M', $a_k$ is a bit with a corresponding subscript in the bit sequence $a_0, a_1, a_2, a_3, \ldots, a_{A-1}$, $b_i$ is an arbitrary code word bit in a code word bit sequence $b_0, b_1, b_2, b_3, \ldots, b_{B-1}$ which is obtained after encoding the bit sequence $a_0, a_1, a_2, a_3, \ldots, a_{A-1}$ of uplink control information in the encoding manner that $$b_i = \left(\sum_{k=0}^{A-1}(a_k \times M'_{i,k})\right) \bmod 2,$$

B is the number of code word bits.

As an embodiment of the present invention, in the method for encoding the uplink control information shown in FIG. 1, shift the column vector of the predefined encoding matrix M to generate the new encoding matrix M', where the predefined encoding matrix M may be $$\begin{bmatrix}
1 & 1 & 0 & 0 & 0 & 0 \\
1 & 1 & 1 & 0 & 0 & 0 \\
1 & 0 & 0 & 1 & 0 & 0 \\
1 & 0 & 1 & 1 & 0 & 0 \\
1 & 1 & 1 & 1 & 0 & 0 \\
1 & 1 & 0 & 0 & 1 & 0 \\
1 & 0 & 1 & 0 & 1 & 0 \\
1 & 0 & 0 & 1 & 1 & 0 \\
1 & 1 & 0 & 1 & 1 & 0 \\
1 & 0 & 1 & 1 & 1 & 0 \\
1 & 0 & 1 & 0 & 0 & 1 \\
1 & 1 & 1 & 0 & 0 & 1 \\
1 & 0 & 0 & 1 & 0 & 1 \\
1 & 1 & 0 & 1 & 0 & 1 \\
1 & 0 & 0 & 0 & 1 & 1 \\
1 & 1 & 0 & 0 & 1 & 1 \\
1 & 1 & 1 & 0 & 1 & 1 \\
1 & 0 & 0 & 1 & 1 & 1 \\
1 & 1 & 0 & 1 & 1 & 1 \\
1 & 0 & 0 & 0 & 0 & 1
\end{bmatrix},$$

and the new encoding matrix M' may be $$\begin{bmatrix} 1 & 0 & 0 & 0 & 0 & 1 \\ 1 & 0 & 0 & 0 & 1 & 1 \\ 1 & 0 & 0 & 1 & 0 & 0 \\ 1 & 0 & 0 & 1 & 1 & 0 \\ 1 & 0 & 0 & 1 & 1 & 1 \\ 1 & 0 & 1 & 0 & 0 & 1 \\ 1 & 0 & 1 & 0 & 1 & 0 \\ 1 & 0 & 1 & 1 & 0 & 0 \\ 1 & 0 & 1 & 1 & 0 & 1 \\ 1 & 0 & 1 & 1 & 1 & 0 \\ 1 & 1 & 0 & 0 & 1 & 0 \\ 1 & 1 & 0 & 0 & 1 & 1 \\ 1 & 1 & 0 & 1 & 0 & 0 \\ 1 & 1 & 0 & 1 & 0 & 1 \\ 1 & 1 & 1 & 0 & 0 & 0 \\ 1 & 1 & 1 & 0 & 0 & 1 \\ 1 & 1 & 1 & 0 & 1 & 1 \\ 1 & 1 & 1 & 1 & 0 & 0 \\ 1 & 1 & 1 & 1 & 0 & 1 \\ 1 & 1 & 0 & 0 & 0 & 0 \end{bmatrix}.$$

It can be seen from the method for encoding the uplink control information according to the embodiment of the present invention that, the encoding matrix used for encoding uplink control information is no longer a fixed predefined encoding matrix, but a new encoding matrix generated after shifting column vectors of the predefined encoding matrix. Comparing with the method in prior art that employs the same encoding matrix to encode uplink control information regardless of the number of bits for the control information, the method provided by embodiments of the present invention can determine a corresponding encoding matrix according to the uplink control information, thereby optimizing the performance of the uplink control information transmission and thus improving the efficiency of downlink transmission.

As an embodiment of shifting the column vectors of the predefined encoding matrix M to generate the new encoding matrix M', it may also be: shifting the column vectors of the predefined encoding matrix M to generate an intermediate matrix R, performing a row interleaving process on the intermediate matrix R in a manner that $M'_{i,k}=R_{pm(i),k}$, and obtaining the new encoding matrix M', where, $R_{pm(i),k}$ is an element on the $pm(i)^{th}$ row and the $k^{th}$ column of the intermediate matrix R, $M'_{i,k}$ is an element on the $i^{th}$ row and the $k^{th}$ column of the new encoding matrix M', pm(i) is the $i^{th}$ element of an interleaving vector pm when performing the interleaving process, i=0, 1, . . . , B−1, B is the number of code word bits of a code word bit sequence obtained after encoding the uplink control information, where, shifting the column vector of the predefined encoding matrix M to generate the intermediate matrix R may be performing the cyclic shift on the column vectors of the predefined encoding matrix M or the fixed shift on the column vectors of the predefined encoding matrix M as provided in the aforementioned embodiment to obtain the intermediate matrix R.

For example, taking performing the cyclic shift on the column vectors of the predefined encoding matrix M as an example, the process of generating the intermediate matrix R is that: the $k^{th}$ column vector $M_k$ of the encoding matrix M is replaced by the $f(k)^{th}$ column vector $M_{f(k)}$ of the encoding matrix M, after the replacement, the encoding matrix M becomes the intermediate matrix R, the $f(k)^{th}$ column vector $M_{f(k)}$ constitutes the $k^{th}$ column vector $R_k$ of the intermediate matrix R, namely, for the intermediate matrix R, $R_k=M_{f(k)}$, where, $f(k)=(f_0(A)+f_1 \times k) \bmod K$, $f_0(A)$ is an integer function of A, $f_1$ is an integer, k=0, 1, . . . , K−1, K is the number of columns of the predefined encoding matrix M, A is the number of bits for the uplink control information, the symbol "mod" is a modulus operation, which represents taking $f_0(A)+f_1 \times k$ modulo K. In this embodiment, $f_0(A)$ may be 1−A, $f_1$ may be 1, namely, $f(k)=(1-A+k) \bmod K$. The function $f(k)$ also represents the number of right cyclic shifts of each column vector during the process of shifting the column vectors of the predefined encoding matrix M to generate the intermediate matrix R. For example, the Polar (20, A) intermediate matrix R is generated by performing a cyclic shift on the first six column vectors of the LTE RM (20, A) encoding matrix M according to the function $f(k)=(1-A+k) \bmod K$, N=20, K=6, the number of right cyclic shifts of each column vector is F=A−1. Taking performing the fixed shift on the column vectors of the predefined encoding matrix M as another example, the process of generating the intermediate matrix R is that: the $k^{th}$ column vector $M_k$ of the encoding matrix M is replaced by the $f(k)^{th}$ column vector $M_{f(k)}$ of the encoding matrix M, after the replacement, the encoding matrix M becomes the intermediate matrix R, the $f(k)^{th}$ column vector $M_{f(k)}$ constitutes the $k^{th}$ column vector $M'_k$ of the intermediate matrix R, namely, for the intermediate matrix R, $R_k=M_{f(k)}$, where, $f(k)=(f_0+f_1 \times k) \bmod K$, $f_0$ and $f_1$ are integers, k=0, 1, . . . , K−1, K is the number of columns of the predefined encoding matrix M. In this embodiment, $f_0$ may be K, $f_1$ may be −1, namely, $f(k)=(K-k) \bmod K$.

In the embodiment that performs the row interleaving process on the intermediate matrix R in a manner that $M'_{i,k}=R_{pm(i),k}$ and generates the new encoding matrix M', the predefined encoding matrix M may be $$\begin{bmatrix} 1 & 1 & 0 & 0 & 0 & 0 \\ 1 & 1 & 1 & 0 & 0 & 0 \\ 1 & 0 & 0 & 1 & 0 & 0 \\ 1 & 0 & 1 & 1 & 0 & 0 \\ 1 & 1 & 1 & 1 & 0 & 0 \\ 1 & 1 & 0 & 0 & 1 & 0 \\ 1 & 0 & 1 & 0 & 1 & 0 \\ 1 & 0 & 0 & 1 & 1 & 0 \\ 1 & 1 & 0 & 1 & 1 & 0 \\ 1 & 0 & 1 & 1 & 1 & 0 \\ 1 & 0 & 1 & 0 & 0 & 1 \\ 1 & 1 & 1 & 0 & 0 & 1 \\ 1 & 0 & 0 & 1 & 0 & 1 \\ 1 & 1 & 0 & 1 & 0 & 1 \\ 1 & 0 & 0 & 0 & 1 & 1 \\ 1 & 1 & 0 & 0 & 1 & 1 \\ 1 & 1 & 1 & 0 & 1 & 1 \\ 1 & 0 & 0 & 1 & 1 & 1 \\ 1 & 1 & 0 & 1 & 1 & 1 \\ 1 & 0 & 0 & 0 & 0 & 1 \end{bmatrix},$$

the intermediate matrix R may be $$\begin{bmatrix} 1 & 0 & 0 & 0 & 0 & 1 \\ 1 & 0 & 0 & 0 & 1 & 1 \\ 1 & 0 & 0 & 1 & 0 & 0 \\ 1 & 0 & 0 & 1 & 1 & 0 \\ 1 & 0 & 0 & 1 & 1 & 1 \\ 1 & 0 & 1 & 0 & 0 & 1 \\ 1 & 0 & 1 & 0 & 1 & 0 \\ 1 & 0 & 1 & 1 & 0 & 0 \\ 1 & 0 & 1 & 1 & 0 & 1 \\ 1 & 0 & 1 & 1 & 1 & 0 \\ 1 & 1 & 0 & 0 & 1 & 0 \\ 1 & 1 & 0 & 0 & 1 & 1 \\ 1 & 1 & 0 & 1 & 0 & 0 \\ 1 & 1 & 0 & 1 & 0 & 1 \\ 1 & 1 & 1 & 0 & 0 & 0 \\ 1 & 1 & 1 & 0 & 0 & 1 \\ 1 & 1 & 1 & 0 & 1 & 1 \\ 1 & 1 & 1 & 1 & 0 & 0 \\ 1 & 1 & 1 & 1 & 0 & 1 \\ 1 & 1 & 0 & 0 & 0 & 0 \end{bmatrix},$$

the interleaving vector pm may be
[1 11 6 16 2 12 7 17 3 13 8 18 4 14 9 19 5 15 10 20],
the new encoding matrix M' may be $$\begin{bmatrix} 1 & 0 & 0 & 0 & 0 & 1 \\ 1 & 0 & 0 & 0 & 1 & 1 \\ 1 & 0 & 0 & 1 & 0 & 0 \\ 1 & 0 & 0 & 1 & 1 & 0 \\ 1 & 0 & 0 & 1 & 1 & 1 \\ 1 & 0 & 1 & 0 & 0 & 1 \\ 1 & 0 & 1 & 0 & 1 & 0 \\ 1 & 0 & 1 & 1 & 0 & 0 \\ 1 & 0 & 1 & 1 & 0 & 1 \\ 1 & 0 & 1 & 1 & 1 & 0 \\ 1 & 1 & 0 & 0 & 1 & 0 \\ 1 & 1 & 0 & 0 & 1 & 1 \\ 1 & 1 & 0 & 1 & 0 & 0 \\ 1 & 1 & 0 & 1 & 0 & 1 \\ 1 & 1 & 1 & 0 & 0 & 0 \\ 1 & 1 & 1 & 0 & 0 & 1 \\ 1 & 1 & 1 & 0 & 1 & 1 \\ 1 & 1 & 1 & 1 & 0 & 0 \\ 1 & 1 & 1 & 1 & 0 & 1 \\ 1 & 1 & 0 & 0 & 0 & 0 \end{bmatrix},$$

Figure 2:
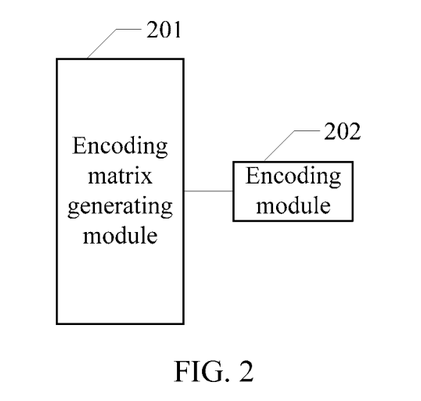
FIG. 2 is a schematic structural diagram of an apparatus for encoding uplink control information according to an embodiment of the present invention.

Please refer to FIG. 2, which is a schematic structural diagram of an apparatus for encoding uplink control information according to an embodiment of the present invention. In order to facilitate the description, only parts related to embodiments of the present invention is shown. The apparatus for encoding the uplink control information shown in FIG. 2 includes an encoding matrix generating module 201 and an encoding module 202, where:

the encoding matrix generating module 201 is configured to shift column vectors of a predefined encoding matrix M to generate a new encoding matrix M';

the encoding module 202 is configured to encode uplink control information by using the new encoding matrix M'.

It should be noted that, in implementations of the apparatus for encoding the uplink control information, the division of each functional module is just for illustration, in the practical application, the aforementioned functions can be accomplished by different functional modules according to the requirement, such as corresponding hardware configuration requirement or a consideration for convenience software implementation, namely, dividing the internal structure of the apparatus for encoding the uplink control information into different functional modules, so as to accomplish all or part of the aforementioned functions. Moreover, in the practical application, corresponding functional modules in the embodiment may be implemented by corresponding hardware or be accomplished by corresponding hardware via executing corresponding software, for example, the aforementioned encoding matrix generating module may be hardware which shifts the column vector of the predefined encoding matrix M to generate the new encoding matrix M', such as an encoding matrix generator, and may also be a general processor or other hardware devices capable of executing corresponding computer programs and thus accomplishing the aforementioned functions; for another example, the aforementioned encoding module may be hardware capable of executing the function that encodes the uplink control information by using the new encoding matrix M', such as an encoder, and may also be a general processor or other hardware devices capable of executing corresponding computer programs and thus accomplishing the aforementioned functions (the aforementioned principle can be applied to all embodiments of the present invention).

Figure 3:
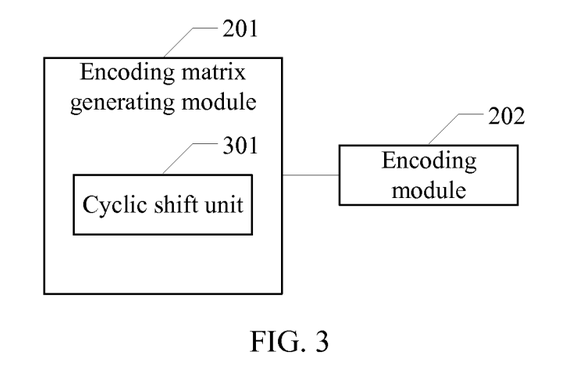
FIG. 3 is a schematic structural diagram of an apparatus for encoding uplink control information according to another embodiment of the present invention.

The encoding matrix generating module 201 shown in FIG. 2 may include a cyclic shift unit 301, as shown in FIG. 3 which illustrates an apparatus for encoding uplink control information according to another embodiment of the present invention. The cyclic shift unit 301 is configured to perform a cyclic shift on the column vectors of the predefined encoding matrix M, so that the $k^{th}$ column vector $M_k$ of the encoding matrix M is replaced by the $f(k)^{th}$ column vector $M_{f(k)}$ of the encoding matrix M, the $f(k)^{th}$ column vector $M_{f(k)}$ constitutes the $k^{th}$ column vector $M'_k$ of the new encoding matrix M', where, $f(k)=(f_0(A)+f_1 \times k) \bmod K$, $f_0(A)$ is an integer function of A, $f_1$ is an integer, k=0, 1, ..., K−1, K is the number of columns of the predefined encoding matrix M, A is the number of bits for the uplink control information, the mod is a modulus operation.

Figure 4:
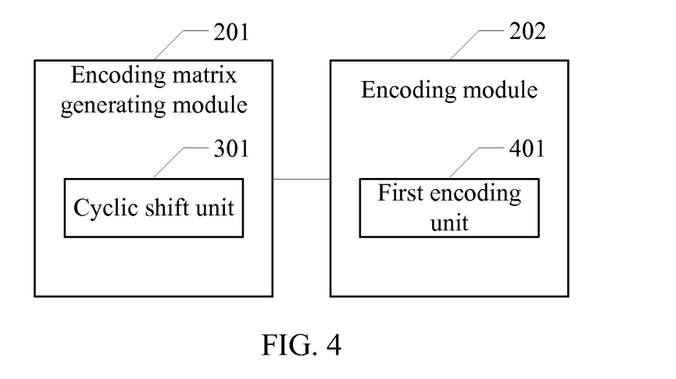
FIG. 4 is a schematic structural diagram of an apparatus for encoding uplink control information according to another embodiment of the present invention.

The encoding module 202 shown in FIG. 3 may include a first encoding unit 401, as shown in FIG. 4 which illustrates an apparatus for encoding uplink control information according to another embodiment of the present invention. The first encoding unit 401 is configured to encode a bit sequence $a_0, a_1, a_2, a_3, \ldots, a_{A-1}$ of the uplink control information in an encoding manner that $$b_i = \left( \sum_{k=0}^{A-1} (a_k \times M'_{i,k}) \right) \bmod 2,$$

where, $M'_{i,k}$ is an element on the $i^{th}$ row and the $k^{th}$ column of the new encoding matrix M', $a_{A-1-k}$ is a bit with a corresponding subscript in the bit sequence $a_0, a_1, a_2, a_3, \ldots, a_{A-1}$, $b_i$ is an arbitrary code word bit in a code word bit sequence $b_0, b_1, b_2, b_3, \ldots, b_{B-1}$ obtained after the encoding, B is the number of code word bits.

Figure 5:
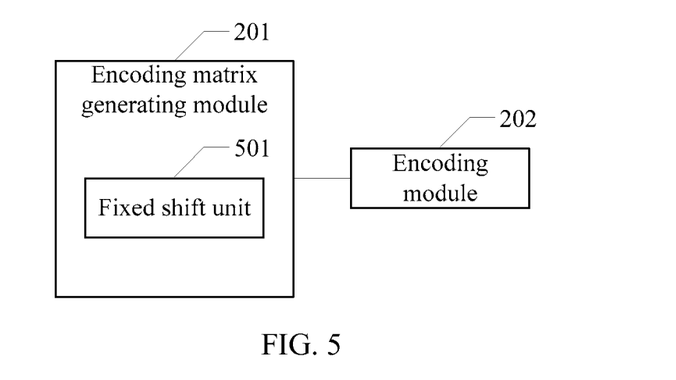
FIG. 5 is a schematic structural diagram of an apparatus for encoding uplink control information according to another embodiment of the present invention.

The encoding matrix generating module 201 shown in FIG. 2 may include a fixed shift unit 501, FIG. 5 shows a schematic structural diagram of an apparatus for encoding uplink control information according to another embodiment of the present invention. The fixed shift unit 501 is configured to perform a fixed shift on the column vectors of the predefined encoding matrix M, so that the $k^{th}$ column vector $M_k$ of the encoding matrix M is replaced by the $f(k)^{th}$ column vector $M_{f(k)}$ of the encoding matrix M, the $f(k)^{th}$ column vector $M_{f(k)}$ constitutes the $k^{th}$ column vector $M'_k$ of the new encoding matrix M', where, $f(k)=(f_0+f_1 \times k) \bmod K$, $f_0$ and $f_1$ are integers, $k=0, 1, \ldots, K-1$, K is the number of columns of the predefined encoding matrix M.

Figure 6:
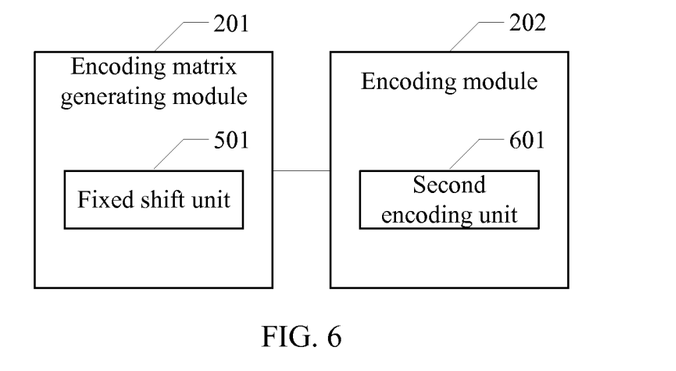
FIG. 6 is a schematic structural diagram of an apparatus for encoding uplink control information according to another embodiment of the present invention.

The encoding module 202 shown in FIG. 5 may include a second encoding unit 601, as shown in FIG. 6 which illustrates an apparatus for encoding uplink control information according to another embodiment of the present invention. The second encoding unit 601 is configured to encode a bit sequence $a_0, a_1, a_2, a_3, \ldots, a_{A-1}$ of the uplink control information in an encoding manner that $$b_i = \left( \sum_{k=0}^{A-1} (a_k \times M'_{i,k}) \right) \bmod 2,$$

where, $M'_{i,k}$ is an element on the $i^{th}$ row and the $k^{th}$ column of the new encoding matrix M', $a_k$ is a bit with a corresponding subscript in the bit sequence $a_0, a_1, a_2, a_3, \ldots, a_{A-1}$, $b_i$ is a code word with a corresponding subscript in a code word bit sequence $b_0, b_1, b_2, b_3, \ldots, b_{B-1}$ which is obtained after the encoding, B is the number of code word bits.

As an embodiment of the present invention, in the apparatus for encoding uplink control information illustrated in FIG. 2 to FIG. 6, the predefined encoding matrix M may be $$\begin{bmatrix} 1 & 1 & 0 & 0 & 0 & 0 \\ 1 & 1 & 1 & 0 & 0 & 0 \\ 1 & 0 & 0 & 1 & 0 & 0 \\ 1 & 0 & 1 & 1 & 0 & 0 \\ 1 & 1 & 1 & 1 & 0 & 0 \\ 1 & 1 & 0 & 0 & 1 & 0 \\ 1 & 0 & 1 & 0 & 1 & 0 \\ 1 & 0 & 0 & 1 & 1 & 0 \\ 1 & 1 & 0 & 1 & 1 & 0 \\ 1 & 0 & 1 & 1 & 1 & 0 \\ 1 & 0 & 1 & 0 & 0 & 1 \\ 1 & 1 & 1 & 0 & 0 & 1 \\ 1 & 0 & 0 & 1 & 0 & 1 \\ 1 & 1 & 0 & 1 & 0 & 1 \\ 1 & 0 & 0 & 0 & 1 & 1 \\ 1 & 1 & 0 & 0 & 1 & 1 \\ 1 & 1 & 1 & 0 & 1 & 1 \\ 1 & 0 & 0 & 1 & 1 & 1 \\ 1 & 1 & 0 & 1 & 1 & 1 \\ 1 & 0 & 0 & 0 & 0 & 1 \end{bmatrix},$$

the new encoding matrix M' may be $$\begin{bmatrix} 1 & 0 & 0 & 0 & 0 & 1 \\ 1 & 0 & 0 & 0 & 1 & 1 \\ 1 & 0 & 0 & 1 & 0 & 0 \\ 1 & 0 & 0 & 1 & 1 & 0 \\ 1 & 0 & 0 & 1 & 1 & 1 \\ 1 & 0 & 1 & 0 & 0 & 1 \\ 1 & 0 & 1 & 0 & 1 & 0 \\ 1 & 0 & 1 & 1 & 0 & 0 \\ 1 & 0 & 1 & 1 & 0 & 1 \\ 1 & 0 & 1 & 1 & 1 & 0 \\ 1 & 1 & 0 & 0 & 1 & 0 \\ 1 & 1 & 0 & 0 & 1 & 1 \\ 1 & 1 & 0 & 1 & 0 & 0 \\ 1 & 1 & 0 & 1 & 0 & 1 \\ 1 & 1 & 1 & 0 & 0 & 0 \\ 1 & 1 & 1 & 0 & 0 & 1 \\ 1 & 1 & 1 & 0 & 1 & 1 \\ 1 & 1 & 1 & 1 & 0 & 0 \\ 1 & 1 & 1 & 1 & 0 & 1 \\ 1 & 1 & 0 & 0 & 0 & 0 \end{bmatrix}.$$

Figure 7:
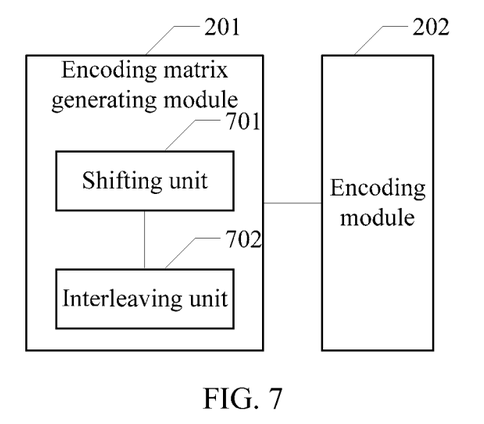
FIG. 7 is a schematic structural diagram of an apparatus for encoding uplink control information according to another embodiment of the present invention.

The encoding module 202 shown in FIG. 2 may include a shifting unit 701 and an interleaving unit 702, as shown in FIG. 7 which illustrates an apparatus for encoding uplink control information according to another embodiment of the present invention, where:

the shifting unit 701 is configured to shift the column vectors of the predefined encoding matrix M to generate an intermediate matrix R, specifically, the shifting unit 701 may be realized by using the cyclic shift unit 301 illustrated in FIG. 3 or the fixed shift unit 501 illustrated in FIG. 5, namely, the shifting unit 701 may perform a cyclic shift on the column vectors of the predefined encoding matrix M, so that the $k^{th}$ column vector $M_k$ of the encoding matrix M is replaced by the $f(k)^{th}$ column vector $M_{f(k)}$ of the encoding matrix M, after the replacement, the encoding matrix M becomes the intermediate matrix R, the $f(k)^{th}$ column vector $M_{f(k)}$ constitutes the $k^{th}$ column vector $R_k$ of the intermediate matrix R, namely, for the intermediate matrix R, $R_k = M_{f(k)}$, where, $f(k)=(f_0(A)+f_1 \times k) \bmod K$, $f_0(A)$ is an integer function of A, $f_1$ is an integer, $k=0, 1, \ldots, K-1$, K is the number of columns of the predefined encoding matrix M, A is the number of bits for the uplink control information, the symbol "mod" is a modulus operation, which represents taking $f_0(A)+f_1 \times k$ modulo K. In this embodiment, $f_0(A)$ may be 1−A, $f_1$ may be 1, namely, $f(k)=(1−A+k) \bmod K$. The function $f(k)$ also represents the number of right cyclic shifts of each column vector during the process of shifting the column vectors of the predefined encoding matrix M to generate the intermediate matrix R. For example, the Polar (20, A) intermediate matrix R is generated by performing a cyclic shift on the first six column vectors of the LTE RM (20, A) encoding matrix M according to the function $f(k)=(1−A+k) \bmod K$, N=20, K=6, the number of right cyclic shifts of each column vector is F=A−1, or, the shifting unit 701 may perform a fixed shift on the column vectors of the predefined encoding matrix M, so that the $k^{th}$ column vector $M_k$ of the encoding matrix M is replaced by the $f(k)^{th}$ column vector $M_{f(k)}$ of the encoding matrix M, after the replacement, the encoding matrix M becomes the intermediate matrix R, the $f(k)^{th}$ column vector $M_{f(k)}$ constitutes the $k^{th}$ column vector $M'_k$ of the intermediate matrix R, namely, for the intermediate matrix R, $R_k = M_{f(k)}$, where, $f(k)=(f_0+f_1 \times k) \bmod K$, $f_0$ and $f_1$ are integers, $k=0, 1, \ldots, K-1$, K is the number of columns of the predefined encoding matrix M. In this embodiment, $f_0$ may be K, $f_1$ may be −1, namely, $f(k)=(K-k)\bmod K$.

The interleaving unit 702 is configured to perform a row interleaving process on the intermediate matrix R in a manner that $M'_{i,k}=R_{pm(i),k}$, and obtain the new encoding matrix M', where, $R_{pm(i),k}$ is an element on the $pm(i)^{th}$ row and the $k^{th}$ column of the intermediate matrix R, $M'_{i,k}$ is an element on the $i^{th}$ row and the $k^{th}$ column of the new encoding matrix M', pm(i) is the $i^{th}$ element of an interleaving vector pm when performing the interleaving process, i=0, 1, . . . , B−1, B is the number of code word bits of a code word bit sequence obtained after encoding the uplink control information.

Specifically, in the apparatus for encoding the uplink control information shown in FIG. 7, the predefined encoding matrix M may be $$\begin{bmatrix} 1 & 1 & 0 & 0 & 0 & 0 \\ 1 & 1 & 1 & 0 & 0 & 0 \\ 1 & 0 & 0 & 1 & 0 & 0 \\ 1 & 0 & 1 & 1 & 0 & 0 \\ 1 & 1 & 1 & 1 & 0 & 0 \\ 1 & 1 & 0 & 0 & 1 & 0 \\ 1 & 0 & 1 & 0 & 1 & 0 \\ 1 & 0 & 0 & 1 & 1 & 0 \\ 1 & 1 & 0 & 1 & 1 & 0 \\ 1 & 0 & 1 & 1 & 1 & 0 \\ 1 & 0 & 1 & 0 & 0 & 1 \\ 1 & 1 & 1 & 0 & 0 & 1 \\ 1 & 0 & 0 & 1 & 0 & 1 \\ 1 & 1 & 0 & 1 & 0 & 1 \\ 1 & 0 & 0 & 0 & 1 & 1 \\ 1 & 1 & 0 & 0 & 1 & 1 \\ 1 & 1 & 1 & 0 & 1 & 1 \\ 1 & 0 & 0 & 1 & 1 & 1 \\ 1 & 1 & 0 & 1 & 1 & 1 \\ 1 & 0 & 0 & 0 & 0 & 1 \end{bmatrix},$$

the intermediate matrix R may be $$\begin{bmatrix} 1 & 0 & 0 & 0 & 0 & 1 \\ 1 & 0 & 0 & 0 & 1 & 1 \\ 1 & 0 & 0 & 1 & 0 & 0 \\ 1 & 0 & 0 & 1 & 1 & 0 \\ 1 & 0 & 0 & 1 & 1 & 1 \\ 1 & 0 & 1 & 0 & 0 & 1 \\ 1 & 0 & 1 & 0 & 1 & 0 \\ 1 & 0 & 1 & 1 & 0 & 0 \\ 1 & 0 & 1 & 1 & 0 & 1 \\ 1 & 0 & 1 & 1 & 1 & 0 \\ 1 & 1 & 0 & 0 & 1 & 0 \\ 1 & 1 & 0 & 0 & 1 & 1 \\ 1 & 1 & 0 & 1 & 0 & 0 \\ 1 & 1 & 0 & 1 & 0 & 1 \\ 1 & 1 & 1 & 0 & 0 & 0 \\ 1 & 1 & 1 & 0 & 0 & 1 \\ 1 & 1 & 1 & 0 & 1 & 1 \\ 1 & 1 & 1 & 1 & 0 & 0 \\ 1 & 1 & 1 & 1 & 0 & 1 \\ 1 & 1 & 0 & 0 & 0 & 0 \end{bmatrix},$$

the interleaving vector pm may be

[1 11 6 16 2 12 7 17 3 13 8 18 4 14 9 19 5 15 10 20], the new encoding matrix M' may be $$\begin{bmatrix} 1 & 0 & 0 & 0 & 0 & 1 \\ 1 & 1 & 0 & 0 & 1 & 0 \\ 1 & 0 & 1 & 0 & 0 & 1 \\ 1 & 1 & 1 & 0 & 0 & 1 \\ 1 & 0 & 0 & 0 & 1 & 1 \\ 1 & 1 & 0 & 0 & 1 & 1 \\ 1 & 0 & 1 & 0 & 1 & 1 \\ 1 & 0 & 1 & 0 & 1 & 0 \\ 1 & 1 & 1 & 0 & 1 & 1 \\ 1 & 0 & 0 & 1 & 0 & 0 \\ 1 & 1 & 0 & 1 & 0 & 0 \\ 1 & 0 & 1 & 1 & 0 & 0 \\ 1 & 1 & 1 & 1 & 0 & 0 \\ 1 & 0 & 0 & 1 & 1 & 0 \\ 1 & 1 & 0 & 1 & 0 & 1 \\ 1 & 1 & 1 & 1 & 0 & 1 \\ 1 & 0 & 0 & 1 & 1 & 1 \\ 1 & 1 & 1 & 0 & 0 & 0 \\ 1 & 0 & 1 & 1 & 1 & 0 \\ 1 & 1 & 0 & 0 & 0 & 0 \end{bmatrix}.$$

Embodiments of the present invention also provide an encoding matrix, where the encoding matrix is M', and the encoding matrix M' may be generated by performing the shift method illustrated in FIG. 1 on the column vectors of the predefined encoding matrix M, namely, performing a cyclic shift on the column vectors of the predefined encoding matrix M, so that the $k^{th}$ column vector $M_k$ of the encoding matrix M is replaced by the $f(k)^{th}$ column vector $M_{f(k)}$ of the encoding matrix M, the $f(k)^{th}$ column vector $M_{f(k)}$ constitutes the $k^{th}$ column vector $M'_k$ of the new encoding matrix M', where, $f(k)=(f_0(A)+f_1\times k)\bmod K$, $f_0(A)$ is an integer function of A, $f_1$ is an integer, k=0, 1, . . . , K−1, K is the number of columns of the predefined encoding matrix M, A is the number of bits for the uplink control information, the mod is a modulus operation, or, performing a fixed shift on the column vectors of the predefined encoding matrix M, so that the $k^{th}$ column vector $M_k$ of the encoding matrix M is replaced by the $f(k)^{th}$ column vector $M_{f(k)}$ of the encoding matrix M, the $f(k)^{th}$ column vector $M_{f(k)}$ constitutes the $k^{th}$ column vector $M'_k$ of the new encoding matrix M', where, $f(k)=(f_0+f_1\times k)\bmod K$, $f_0$ and $f_1$ are integers, k=0, 1, . . . , K−1, and K is the number of columns of the predefined encoding matrix M, where, the predefined encoding matrix M may be $$\begin{bmatrix} 1 & 1 & 0 & 0 & 0 & 0 \\ 1 & 1 & 1 & 0 & 0 & 0 \\ 1 & 0 & 0 & 1 & 0 & 0 \\ 1 & 0 & 1 & 1 & 0 & 0 \\ 1 & 1 & 1 & 1 & 0 & 0 \\ 1 & 1 & 0 & 0 & 1 & 0 \\ 1 & 0 & 1 & 0 & 1 & 0 \\ 1 & 0 & 0 & 1 & 1 & 0 \\ 1 & 1 & 0 & 1 & 1 & 0 \\ 1 & 0 & 1 & 1 & 1 & 0 \\ 1 & 0 & 1 & 0 & 0 & 1 \\ 1 & 1 & 1 & 0 & 0 & 1 \\ 1 & 0 & 0 & 1 & 0 & 1 \\ 1 & 1 & 0 & 1 & 0 & 1 \\ 1 & 0 & 0 & 0 & 1 & 1 \\ 1 & 1 & 0 & 0 & 1 & 1 \\ 1 & 1 & 1 & 0 & 1 & 1 \\ 1 & 0 & 0 & 1 & 1 & 1 \\ 1 & 1 & 0 & 1 & 1 & 1 \\ 1 & 0 & 0 & 0 & 0 & 1 \end{bmatrix},$$

the encoding matrix M' may be $$\begin{bmatrix} 1 & 0 & 0 & 0 & 0 & 1 \\ 1 & 0 & 0 & 0 & 1 & 1 \\ 1 & 0 & 0 & 1 & 0 & 0 \\ 1 & 0 & 0 & 1 & 1 & 0 \\ 1 & 0 & 0 & 1 & 1 & 1 \\ 1 & 0 & 1 & 0 & 0 & 1 \\ 1 & 0 & 1 & 0 & 1 & 0 \\ 1 & 0 & 1 & 1 & 0 & 0 \\ 1 & 0 & 1 & 1 & 0 & 1 \\ 1 & 0 & 1 & 1 & 1 & 0 \\ 1 & 1 & 0 & 0 & 1 & 0 \\ 1 & 1 & 0 & 0 & 1 & 1 \\ 1 & 1 & 0 & 1 & 0 & 0 \\ 1 & 1 & 0 & 1 & 0 & 1 \\ 1 & 1 & 1 & 0 & 0 & 0 \\ 1 & 1 & 1 & 0 & 0 & 1 \\ 1 & 1 & 1 & 0 & 1 & 1 \\ 1 & 1 & 1 & 1 & 0 & 0 \\ 1 & 1 & 1 & 1 & 0 & 1 \\ 1 & 1 & 0 & 0 & 0 & 0 \end{bmatrix}.$$

It should be noted that, detailed description of the information exchange, the execution process and other content among modules/units in the aforementioned apparatus are not repeated herein, since they are based on the same design as the method embodiments of the present invention, and bring the same technical effect as the method embodiments of the present invention, reference may be made to the description in the method embodiments of the present invention.

Those skilled in the art understand that all or a portion of the steps of all the methods in the foregoing embodiments of the invention may be implemented by related hardware under the instruction of a program, such as one or more or all of the following methods:

shifting column vectors of a predefined encoding matrix M to generate a new encoding matrix M';

encoding uplink control information by using the new encoding matrix M'.

Those skilled in the art understand that all or a portion of the steps of all the methods in the foregoing embodiments of the invention can be implemented by related hardware under the instruction of a program. The program can be stored in a computer readable storage medium, such as a read-only memory (ROM), a random access memory (RAM), a magnetic disk, or a compact disk.

The method and the apparatus for encoding the uplink control information of the embodiment of the present invention are described in detail in the foregoing, detailed examples are applied in the application to illustrate the principle and the implementation of the present invention, the description of the aforementioned embodiments is only used for the sake of understanding the method and the core idea of the present invention; in the meantime, for a common technical person skilled in the art, according to the idea of the present invention, changes may be made to the specific implementations and the application scope, therefore, the content in the description should not be interpreted as a limitation to the present invention.

The invention claimed is:

1. A method for encoding uplink control information, the method comprising:

obtaining an encoding matrix M'; and encoding, by an encoding apparatus, the uplink control information by using the encoding matrix M';

wherein the encoding matrix M' is:

$$\begin{bmatrix} 1 & 0 & 0 & 0 & 0 & 1 \\ 1 & 0 & 0 & 0 & 1 & 1 \\ 1 & 0 & 0 & 1 & 0 & 0 \\ 1 & 0 & 0 & 1 & 1 & 0 \\ 1 & 0 & 0 & 1 & 1 & 1 \\ 1 & 0 & 1 & 0 & 0 & 1 \\ 1 & 0 & 1 & 0 & 1 & 0 \\ 1 & 0 & 1 & 1 & 0 & 0 \\ 1 & 0 & 1 & 1 & 0 & 1 \\ 1 & 0 & 1 & 1 & 1 & 0 \\ 1 & 1 & 0 & 0 & 1 & 0 \\ 1 & 1 & 0 & 0 & 1 & 1 \\ 1 & 1 & 0 & 1 & 0 & 0 \\ 1 & 1 & 0 & 1 & 0 & 1 \\ 1 & 1 & 1 & 0 & 0 & 0 \\ 1 & 1 & 1 & 0 & 0 & 1 \\ 1 & 1 & 1 & 0 & 1 & 1 \\ 1 & 1 & 1 & 1 & 0 & 0 \\ 1 & 1 & 1 & 1 & 0 & 1 \\ 1 & 1 & 0 & 0 & 0 & 0 \end{bmatrix} \text{ or } \begin{bmatrix} 1 & 0 & 0 & 0 & 0 & 1 \\ 1 & 1 & 0 & 0 & 1 & 0 \\ 1 & 0 & 1 & 0 & 0 & 1 \\ 1 & 1 & 1 & 0 & 0 & 1 \\ 1 & 0 & 0 & 0 & 1 & 1 \\ 1 & 1 & 0 & 0 & 1 & 1 \\ 1 & 0 & 1 & 0 & 1 & 0 \\ 1 & 1 & 1 & 0 & 1 & 1 \\ 1 & 0 & 0 & 1 & 0 & 0 \\ 1 & 1 & 0 & 1 & 0 & 0 \\ 1 & 0 & 1 & 1 & 0 & 0 \\ 1 & 1 & 1 & 1 & 0 & 0 \\ 1 & 0 & 0 & 1 & 1 & 0 \\ 1 & 1 & 0 & 1 & 0 & 1 \\ 1 & 0 & 1 & 1 & 0 & 1 \\ 1 & 1 & 1 & 1 & 0 & 1 \\ 1 & 0 & 0 & 1 & 1 & 1 \\ 1 & 1 & 1 & 0 & 0 & 0 \\ 1 & 0 & 1 & 1 & 1 & 0 \\ 1 & 1 & 0 & 0 & 0 & 0 \end{bmatrix}.$$

2. An encoding apparatus for encoding uplink control information, the encoding apparatus comprising:

a processor, configured to obtain an encoding matrix M'; and an encoder, configured to encode the uplink control information by using the encoding matrix M';

wherein the encoding matrix M' is:

$$M' = \begin{bmatrix} 1 & 0 & 0 & 0 & 0 & 1 \\ 1 & 0 & 0 & 0 & 1 & 1 \\ 1 & 0 & 0 & 1 & 0 & 0 \\ 1 & 0 & 0 & 1 & 1 & 0 \\ 1 & 0 & 0 & 1 & 1 & 1 \\ 1 & 0 & 1 & 0 & 0 & 1 \\ 1 & 0 & 1 & 0 & 1 & 0 \\ 1 & 0 & 1 & 1 & 0 & 0 \\ 1 & 0 & 1 & 1 & 0 & 1 \\ 1 & 0 & 1 & 1 & 1 & 0 \\ 1 & 1 & 0 & 0 & 1 & 0 \\ 1 & 1 & 0 & 0 & 1 & 1 \\ 1 & 1 & 0 & 1 & 0 & 0 \\ 1 & 1 & 0 & 1 & 0 & 1 \\ 1 & 1 & 1 & 0 & 0 & 0 \\ 1 & 1 & 1 & 0 & 0 & 1 \\ 1 & 1 & 1 & 0 & 1 & 1 \\ 1 & 1 & 1 & 1 & 0 & 0 \\ 1 & 1 & 1 & 1 & 0 & 1 \\ 1 & 1 & 0 & 0 & 0 & 0 \end{bmatrix} \text{ or } \begin{bmatrix} 1 & 0 & 0 & 0 & 0 & 1 \\ 1 & 1 & 0 & 0 & 1 & 0 \\ 1 & 0 & 1 & 0 & 0 & 1 \\ 1 & 1 & 1 & 0 & 0 & 1 \\ 1 & 0 & 0 & 0 & 1 & 1 \\ 1 & 1 & 0 & 0 & 1 & 1 \\ 1 & 0 & 1 & 0 & 1 & 0 \\ 1 & 1 & 1 & 0 & 1 & 1 \\ 1 & 0 & 0 & 1 & 0 & 0 \\ 1 & 1 & 0 & 1 & 0 & 0 \\ 1 & 0 & 1 & 1 & 0 & 0 \\ 1 & 1 & 1 & 1 & 0 & 0 \\ 1 & 0 & 0 & 1 & 1 & 0 \\ 1 & 1 & 0 & 1 & 0 & 1 \\ 1 & 0 & 1 & 1 & 0 & 1 \\ 1 & 1 & 1 & 1 & 0 & 1 \\ 1 & 0 & 0 & 1 & 1 & 1 \\ 1 & 1 & 1 & 0 & 0 & 0 \\ 1 & 0 & 1 & 1 & 1 & 0 \\ 1 & 1 & 0 & 0 & 0 & 0 \end{bmatrix}.$$

\* \* \* \* \*